United States Patent
Li et al.

(10) Patent No.: US 8,204,024 B2
(45) Date of Patent: Jun. 19, 2012

(54) METHOD AND APPARATUS FOR SUPPORTING DOWNLINK JOINT DETECTION IN TDD CDMA SYSTEMS

(75) Inventors: Yueheng Li, Shanghai (CN); Li Sun, Shanghai (CN); Gang Wu, Shanghai (CN)

(73) Assignee: ST-Ericsson SA, Geneva (CH)

( * ) Notice: Subject to any disclaimer, the term of this patent is extended or adjusted under 35 U.S.C. 154(b) by 1016 days.

(21) Appl. No.: 10/580,722

(22) PCT Filed: Nov. 4, 2004

(86) PCT No.: PCT/IB2004/052293
§ 371 (c)(1),
(2), (4) Date: May 24, 2006

(87) PCT Pub. No.: WO2005/053176
PCT Pub. Date: Jun. 9, 2005

(65) Prior Publication Data
US 2007/0165620 A1    Jul. 19, 2007

(30) Foreign Application Priority Data
Nov. 27, 2003    (CN) .......................... 2003 1 0118644

(51) Int. Cl.
*H04B 7/216* (2006.01)
(52) U.S. Cl. ........ 370/335; 370/342; 370/347; 370/320; 370/321; 370/376; 375/147; 375/148; 375/149; 375/150
(58) Field of Classification Search .................. 370/376, 370/458, 335, 342, 345, 320, 208, 210; 375/141–142; 455/504–506, 69
See application file for complete search history.

(56) References Cited

U.S. PATENT DOCUMENTS

| | | | |
|---|---|---|---|
| 2003/0210660 A1 * | 11/2003 | Wiberg et al. | 370/320 |
| 2004/0052236 A1 * | 3/2004 | Hwang et al. | 370/342 |
| 2007/0030885 A1 * | 2/2007 | Jechoux et al. | 375/141 |
| 2009/0213904 A1 * | 8/2009 | Sun et al. | 375/141 |

FOREIGN PATENT DOCUMENTS

| | | |
|---|---|---|
| CA | 2301682 A1 | 3/1999 |
| EP | 1 137 201 | 9/2001 |
| EP | 1 143 638 | 10/2001 |
| EP | 1143638 A1 * | 10/2001 |
| JP | 2001515326 A | 9/2001 |
| JP | 2003124845 A | 4/2003 |

(Continued)

OTHER PUBLICATIONS

Klein Anja: "Data Detection Algorithms Specially Designed for the Downlink . . . "; IEEE International Conf. on Vehicle Technology; vol. 1; May 1997; pp. 203-207. Germany.

(Continued)

*Primary Examiner* — Nick Corsaro
*Assistant Examiner* — Babar Sarwar (57) ABSTRACT

A method is proposed for supporting downlink JD (joint detection) in a TDD CDMA communication network system, comprising steps of: judging whether the CAI (code allocation information) in a downlink timeslot will change in the next TTI (transmission time interval); if the CAI will change, inserting the changed CAI as a specific control information into a specified field in the traffic burst in the downlink timeslot corresponding to current TTI; sending the traffic burst containing the specific control information to each UE (user equipment) in the downlink timeslot via a downlink channel.

20 Claims, 7 Drawing Sheets

FOREIGN PATENT DOCUMENTS

| | | |
|---|---|---|
| JP | 2003143034 A | 5/2003 |
| JP | 2003174431 A | 6/2003 |
| WO | WO 2004/064265 | 7/2004 |
| WO | WO 2004/091238 | 10/2004 |

OTHER PUBLICATIONS

Shao-Li Kang: "Performance of Active Detection Algorithms for the Downlink of TD-SCDMA System"; IEEE Inter. Symposium on Circuit and Systems; vol. 1, 2002; pp. 613-616.

Kourtis S.: "Technology Requirements of the 3GPP-TDD Terminal"; IEEE 2000 Inter. Conf. on 3G Mobile Communication Technologies; pp. 89-93.

Physical Channels and Mapping of Transport Channels Onto Physical Channels (TDD)' Release 4; Mar. 2001.

Office Action dated Jun. 15, 2010 in connection with Japanese Patent Application No. 2006-540679.

\* cited by examiner

| Slot Format # | Spreading Factor | Midamble length (chips) | $N_{TFCI}$ (bits) | $N_{SS}$ & $N_{TPC}$ (bits) | Bits/slot | $N_{Data/Slot}$ (bits) | $N_{data/field(1}$ (bits) | $N_{data/field(2)}$ (bits) |
|---|---|---|---|---|---|---|---|---|
| 0 | 16 | 144 | 0 | 0 & 0 | 88 | 88 | 44 | 44 |
| 1 | 16 | 144 | 4 | 0 & 0 | 88 | 86 | 42 | 44 |
| 2 | 16 | 144 | 8 | 0 & 0 | 88 | 84 | 42 | 42 |
| 3 | 16 | 144 | 16 | 0 & 0 | 88 | 80 | 40 | 40 |
| 4 | 16 | 144 | 32 | 0 & 0 | 88 | 72 | 36 | 36 |
| 5 | 16 | 144 | 0 | 2 & 2 | 88 | 84 | 44 | 40 |
| 6 | 16 | 144 | 4 | 2 & 2 | 88 | 82 | 42 | 40 |
| 7 | 16 | 144 | 8 | 2 & 2 | 88 | 80 | 42 | 38 |
| 8 | 16 | 144 | 16 | 2 & 2 | 88 | 76 | 40 | 36 |
| 9 | 16 | 144 | 32 | 2 & 2 | 88 | 68 | 36 | 32 |
| 10 | 1 | 144 | 0 | 0 & 0 | 1408 | 1408 | 704 | 704 |
| 11 | 1 | 144 | 4 | 0 & 0 | 1408 | 1406 | 702 | 704 |
| 12 | 1 | 144 | 8 | 0 & 0 | 1408 | 1404 | 702 | 702 |
| 13 | 1 | 144 | 16 | 0 & 0 | 1408 | 1400 | 700 | 700 |
| 14 | 1 | 144 | 32 | 0 & 0 | 1408 | 1392 | 696 | 696 |
| 15 | 1 | 144 | 0 | 2 & 2 | 1408 | 1404 | 704 | 700 |
| 16 | 1 | 144 | 4 | 2 & 2 | 1408 | 1402 | 702 | 700 |
| 17 | 1 | 144 | 8 | 2 & 2 | 1408 | 1400 | 702 | 698 |
| 18 | 1 | 144 | 16 | 2 & 2 | 1408 | 1396 | 700 | 696 |
| 19 | 1 | 144 | 32 | 2 & 2 | 1408 | 1388 | 696 | 692 |
| 20 | 1 | 144 | 0 | 32 & 32 | 1408 | 1344 | 704 | 640 |
| 21 | 1 | 144 | 4 | 32 & 32 | 1408 | 1342 | 702 | 640 |
| 22 | 1 | 144 | 8 | 32 & 32 | 1408 | 1340 | 702 | 638 |
| 23 | 1 | 144 | 16 | 32 & 32 | 1408 | 1336 | 700 | 636 |
| 24 | 1 | 144 | 32 | 32 & 32 | 1408 | 1328 | 696 | 632 |

| Slot Format# | Spreading Factor | Midamble length (chips) | $N_{CA}$ (bits) | $N_{TFCI}$ (bits) | $N_{SS}$ & $N_{TPC}$ (bits) | Bits/slot | $N_{Data/slot}$ (bits) | $N_{data field(1)}$ (bits) | $N_{data field(2)}$ (bits) |
|---|---|---|---|---|---|---|---|---|---|
| 0 | 16 | 144 | 0 | 0 | 0 & 0 | 88 | 88 | 44 | 44 |
| 0 | 16 | 144 | 16 | 0 | 0 & 0 | 88 | 88 | 28 | 44 |
| 1 | 16 | 144 | 0 | 4 | 0 & 0 | 88 | 86 | 42 | 44 |
| 1 | 16 | 144 | 16 | 4 | 0 & 0 | 88 | 86 | 26 | 44 |
| 2 | 16 | 144 | 0 | 8 | 0 & 0 | 88 | 84 | 42 | 42 |
| 2 | 16 | 144 | 16 | 8 | 0 & 0 | 88 | 84 | 26 | 42 |
| 3 | 16 | 144 | 0 | 16 | 0 & 0 | 88 | 80 | 40 | 40 |
| 3 | 16 | 144 | 16 | 16 | 0 & 0 | 88 | 80 | 24 | 40 |
| 4 | 16 | 144 | 0 | 32 | 0 & 0 | 88 | 72 | 36 | 36 |
| 4 | 16 | 144 | 16 | 32 | 0 & 0 | 88 | 72 | 20 | 36 |
| 5 | 16 | 144 | 0 | 0 | 2 & 2 | 88 | 84 | 44 | 40 |
| 5 | 16 | 144 | 16 | 0 | 2 & 2 | 88 | 84 | 28 | 40 |
| 6 | 16 | 144 | 0 | 4 | 2 & 2 | 88 | 82 | 42 | 40 |
| 6 | 16 | 144 | 16 | 4 | 2 & 2 | 88 | 82 | 26 | 40 |
| 7 | 16 | 144 | 0 | 8 | 2 & 2 | 88 | 80 | 42 | 38 |
| 7 | 16 | 144 | 16 | 8 | 2 & 2 | 88 | 80 | 26 | 38 |
| 8 | 16 | 144 | 0 | 16 | 2 & 2 | 88 | 76 | 40 | 36 |
| 8 | 16 | 144 | 16 | 16 | 2 & 2 | 88 | 76 | 24 | 36 |
| 9 | 16 | 144 | 0 | 32 | 2 & 2 | 88 | 68 | 36 | 32 |
| 9 | 16 | 144 | 16 | 32 | 2 & 2 | 88 | 68 | 20 | 32 |
| 10 | 1 | 144 | 0 | 0 | 0 & 0 | 1408 | 1408 | 704 | 704 |
| 11 | 1 | 144 | 0 | 4 | 0 & 0 | 1408 | 1406 | 702 | 704 |
| 12 | 1 | 144 | 0 | 8 | 0 & 0 | 1408 | 1404 | 702 | 702 |
| 13 | 1 | 144 | 0 | 16 | 0 & 0 | 1408 | 1400 | 700 | 700 |
| 14 | 1 | 144 | 0 | 32 | 0 & 0 | 1408 | 1392 | 696 | 696 |
| 15 | 1 | 144 | 0 | 0 | 2 & 2 | 1408 | 1404 | 704 | 700 |
| 16 | 1 | 144 | 0 | 4 | 2 & 2 | 1408 | 1402 | 702 | 700 |
| 17 | 1 | 144 | 0 | 8 | 2 & 2 | 1408 | 1400 | 702 | 698 |
| 18 | 1 | 144 | 0 | 16 | 2 & 2 | 1408 | 1396 | 700 | 696 |
| 19 | 1 | 144 | 0 | 32 | 2 & 2 | 1408 | 1388 | 696 | 692 |
| 20 | 1 | 144 | 0 | 0 | 32 & 32 | 1408 | 1344 | 704 | 640 |
| 21 | 1 | 144 | 0 | 4 | 32 & 32 | 1408 | 1342 | 702 | 640 |
| 22 | 1 | 144 | 0 | 8 | 32 & 32 | 1408 | 1340 | 702 | 638 |
| 23 | 1 | 144 | 0 | 16 | 32 & 32 | 1408 | 1336 | 700 | 636 |
| 24 | 1 | 144 | 0 | 32 | 32 & 32 | 1408 | 1328 | 696 | 632 |

Fig. 6

| Bit3 | Bit2 | Bit1 | Bit0 | User number |
|---|---|---|---|---|
| 1 | 1 | 1 | 1 | 16 |
| 1 | 1 | 1 | 0 | 15 |
| 1 | 1 | 0 | 1 | 14 |
| 1 | 1 | 0 | 0 | 13 |
| 1 | 1 | 0 | 1 | 12 |
| 1 | 1 | 0 | 0 | 11 |
| 1 | 0 | 0 | 1 | 10 |
| 1 | 0 | 0 | 0 | 9 |
| 0 | 1 | 1 | 1 | 7 |
| 0 | 1 | 1 | 0 | 6 |
| 0 | 1 | 0 | 1 | 5 |
| 0 | 1 | 0 | 0 | 4 |
| 0 | 0 | 1 | 1 | 3 |
| 0 | 0 | 1 | 0 | 2 |
| 0 | 0 | 0 | 1 | 1 |

Fig. 7

| Slot Format# | Spreading Factor | Midamble length (chips) | $N_{AC}$ (bits) | $N_{TFCI}$ (bits) | $N_{SS}$ & $N_{TPC}$ (bits) | Bits /slot | $N_{data/Slot}$ (bits) | $N_{data/field(1)}$ (bits) | $N_{data/field(2)}$ (bits) |
|---|---|---|---|---|---|---|---|---|---|
| 0 | 16 | 144 | 0 | 0 | 0 & 0 | 88 | 88 | 44 | 44 |
| 0A | 16 | 144 | 4 | 0 | 0 & 0 | 88 | 86 | 40 | 44 |
| 1 | 16 | 144 | 0 | 4 | 0 & 0 | 88 | 86 | 42 | 44 |
| 1A | 16 | 144 | 4 | 4 | 0 & 0 | 88 | 86 | 38 | 44 |
| 2 | 16 | 144 | 0 | 8 | 0 & 0 | 88 | 84 | 42 | 42 |
| 2A | 16 | 144 | 4 | 8 | 0 & 0 | 88 | 84 | 38 | 42 |
| 3 | 16 | 144 | 0 | 16 | 0 & 0 | 88 | 80 | 40 | 40 |
| 3A | 16 | 144 | 4 | 16 | 0 & 0 | 88 | 80 | 36 | 40 |
| 4 | 16 | 144 | 0 | 32 | 0 & 0 | 88 | 72 | 36 | 36 |
| 4A | 16 | 144 | 4 | 32 | 0 & 0 | 88 | 72 | 32 | 36 |
| 5 | 16 | 144 | 0 | 0 | 2 & 2 | 88 | 84 | 44 | 40 |
| 5A | 16 | 144 | 4 | 0 | 2 & 2 | 88 | 84 | 40 | 40 |
| 6 | 16 | 144 | 0 | 4 | 2 & 2 | 88 | 82 | 42 | 40 |
| 6A | 16 | 144 | 4 | 4 | 2 & 2 | 88 | 82 | 38 | 40 |
| 7 | 16 | 144 | 0 | 8 | 2 & 2 | 88 | 80 | 42 | 38 |
| 7A | 16 | 144 | 4 | 8 | 2 & 2 | 88 | 80 | 38 | 38 |
| 8 | 16 | 144 | 0 | 16 | 2 & 2 | 88 | 76 | 40 | 36 |
| 8A | 16 | 144 | 4 | 16 | 2 & 2 | 88 | 76 | 36 | 36 |
| 9 | 16 | 144 | 0 | 32 | 2 & 2 | 88 | 68 | 36 | 32 |
| 9A | 16 | 144 | 4 | 32 | 2 & 2 | 88 | 68 | 32 | 32 |
| 10 | 1 | 144 | 0 | 0 | 0 & 0 | 1408 | 1408 | 704 | 704 |
| 11 | 1 | 144 | 0 | 4 | 0 & 0 | 1408 | 1406 | 702 | 704 |
| 12 | 1 | 144 | 0 | 8 | 0 & 0 | 1408 | 1404 | 702 | 702 |
| 13 | 1 | 144 | 0 | 16 | 0 & 0 | 1408 | 1400 | 700 | 700 |
| 14 | 1 | 144 | 0 | 32 | 0 & 0 | 1408 | 1392 | 696 | 696 |
| 15 | 1 | 144 | 0 | 0 | 2 & 2 | 1408 | 1404 | 704 | 700 |
| 16 | 1 | 144 | 0 | 4 | 2 & 2 | 1408 | 1402 | 702 | 700 |
| 17 | 1 | 144 | 0 | 8 | 2 & 2 | 1408 | 1400 | 702 | 698 |
| 18 | 1 | 144 | 0 | 16 | 2 & 2 | 1408 | 1396 | 700 | 696 |
| 19 | 1 | 144 | 0 | 32 | 2 & 2 | 1408 | 1388 | 696 | 692 |
| 20 | 1 | 144 | 0 | 0 | 32 & 32 | 1408 | 1344 | 704 | 640 |
| 21 | 1 | 144 | 0 | 4 | 32 & 32 | 1408 | 1342 | 702 | 640 |
| 22 | 1 | 144 | 0 | 8 | 32 & 32 | 1408 | 1340 | 702 | 638 |
| 23 | 1 | 144 | 0 | 16 | 32 & 32 | 1408 | 1336 | 700 | 636 |
| 24 | 1 | 144 | 0 | 32 | 32 & 32 | 1408 | 1328 | 696 | 632 |

METHOD AND APPARATUS FOR SUPPORTING DOWNLINK JOINT DETECTION IN TDD CDMA SYSTEMS

FIELD OF THE INVENTION

The present invention relates generally to a communication method and apparatus, and more particularly, to a method for supporting downlink JD (joint detection) in TDD CDMA communication systems, such as TD-SCDMA system.

BACKGROUND OF THE INVENTION

In TDD CDMA based wireless communication systems, there are mainly two intra-cell interferences: one is MAI (multiple access interference), caused by sharing of the same frequency band by different users and the loss of orthogonality between the spreading codes allocated for different users due to the multipath channel effects; another is ISI (inter-symbol interference) between different paths of the same user, caused by multipath propagation.

To effectively mitigate MAI and ISI, JD (joint detection) is introduced to conventional TDD CDMA communication systems. JD takes full advantage of the spreading codes, channel fading, signal delay and other information about the user signal, so it can improve signal transmission quality in the cell and increase TDD wireless communication system capacity. Furthermore, JD is suitable for existing HCR (HCR: High Chip Rate, 3.84 Mchip/s) and LCR (LCR: Low Chip Rate, 1.28 Mchip/s) TDD systems, and even higher chip rate candidate proposal of 7.68 Mchip/s discussed now by 3GPP. Thus, it can be seen that, JD technique has become one of the key technologies in current TDD CDMA systems.

T3G, a JV organized by Datang, Philips and Sumsang to develop TD-SCDMA handset solution designs, has adopted JD algorithms of ZF-BLE (ZF-BLE: zero forcing block linear equalizer) and MMSE-BLE (minimum mean square error block linear equalizer) in her first 3G mobile products.

However, the implementation of ZF-BLE and MMSE-BLE algorithms needs to know as precondition the spreading codes of all active UEs. For the base station, this won't pose as a problem, because the base station is responsible for resource allocation and thus can know the spreading codes of all users very easily. But for a UE, it only knows its own spreading code and has no knowledge of the spreading codes of other UEs sharing the same timeslot. Thus it is no easy job to implement JD algorithms for UEs.

To implement JD algorithms in UEs, one solution is to add an additional "active-code detection" module in the receiver of a TD-SCDMA handset so that information about other UEs' spreading codes can be recovered in a single UE, which can be referred to "Performance of active codes detection algorithms for the downlink of TD-SCDMA system," IEEE Inter. symposium on circuit and systems (ISCS), Vol. 1, 2002, pp. 613-616, by Kang Shao-li et al, and "Technology requirements of the 3GPP-TDD terminal," IEEE 2000 Inter. conf. on 3G Mobile communication technologies, pp. 89-93 by S. Kourist et al. Unfortunately, this solution using "active-code detection" module has very poor performance in some cases, especially in the environment of lower vehicle speed and multipath fading, which causes severe system capacity loss.

There is also another optional solution of adopting equalized single user detection JD algorithm called MMSE-BLE-SD, which can be referred to "Data detection algorithms specially designed for the downlink of CDMA mobile radio systems," IEEE International Conf. on Vehicle Technology (VTC), Vol. 1, May 1997, pp. 203-207, by A. Klein. Compared with ZF-BLE/MMSE-BLE, the performance of MMSE-BLE-SD is a little poorer, but its advantage is only need to know the spreading code of the UE. However, MMSE-BLE-SD algorithm also has to know the ACN (active code number) allocated in the same timeslot as the UE in advance. Although the ACN can be estimated at the UE by some special algorithms, the single-user receiver's complexity and power consumption will be increased heavily due to the added huge computation loads.

In fact, the above two problems can both be easily overcome through sending the mandatory information of the spreading codes or the ACN via some downlink channels to each UE by the base station.

A method of transmitting the related spreading codes information from the base station via common control channel (such as BCH) to UEs, is described in the patent application document entitled "Mobile station enabled for use of an advanced detection algorithm", submitted on Jan. 13, 2003, filed by KONINKLIJKE PHILIPS ELECTRONICS N.V. and EPO Application Serial No. 03075075.6. According to the method as disclosed in this patent application, the spreading code associated with a midamble can be obtained from the midamble allocation information. However, it is restricted to the case of knowing the association relationship between midambles and channelization codes, that is, the so-called "default midamble" case. There are two other midamble allocation cases in the 3GPP TDD standard: (i) the "common midamble", wherein all users sharing the same timeslot use the same midamble; (ii) the "midamble allocation by signaling from higher layers", wherein there is no fixed relationship between the allocated spreading codes and midambles, which can be referred to 3GPP Technical Specifications 25.221, "Physical Channels and mapping of transport channels onto physical channels (TDD)", (Release 4), March, 2001. In these two cases, the method as disclosed in the patent application has some restricts.

A method to broadcast the CAI (codes allocation information) directly on downlink common control channel (such as BCH) is proposed in the patent application document entitled "Method and apparatus for supporting P2P communication in TDD CDMA system", filed by KONINKLIJKE PHILIPS ELECTRONICS. N.V. and the Application Serial No. 03110415.0. According to the method as disclosed in this patent application, common control channel has fixed position in a radio frame or sub-frame (for instance, BCH is in TS0), thus every UE can receive the CAI and perform JD by using the CAI. But, a problem will arise when BCH is used to transfer the information. The repetition period of BCH is at least 80 ms (8 radio frames) or even longer (160, 320, or 640 ms, to be decided by the higher layer).

When CAI varies rapidly, it's likely too late to update the information. Moreover, if a large mount of CAI has to be transmitted over BCH every repetition period, continuous overloads on BCH will happen inevitably.

In fact, the change of CAI only occurs in three situations: first, early when communication connection is being established, the base station allocates spreading codes to new UEs; second, during communication course, change of users in the same timeslot occurs, for example, other users enter or leave the timeslot and thus the allocation of spreading codes changes accordingly; third, communicating UEs handover to other cells and release the spreading codes in the former cell. It can be seen from the three cases that, the change of CAI only occurs in certain time period. If the system is very stable, it is of no necessity to transmit the CAI every repetition period over BCH. Moreover, the change of CAI only affects UEs associated with the same timeslot, but has no impact on any other UEs working in other timeslots.

Therefore, a more effective method is needed to provide CAI so that the UEs can perform JD algorithms by using the CAI.

SUMMARY OF THE INVENTION

The above analysis shows, when CAI changes in TDD CDMA communication systems, it can be a more reasonable way to retransmit the changed CAI in the associated downlink timeslot.

One object of the present invention is to provide a method and apparatus for supporting downlink JD in TDD CDMA communication systems. With the method and apparatus, CAI will only be sent to the associated UEs when CAI changes so that each UE receiving the CAI can implement ZF-BLE/MMSE-BLE JD algorithm by using the CAI, thus the communication quality for each UE can be improved.

Another object of the present invention is to provide a method and apparatus for supporting downlink JD in TDD CDMA communication systems. With the method and apparatus, the ACN will only be sent to the associated UEs when the ACN changes, so that each UE receiving the ACN can implement ZF-BLE/MMSE-BLE JD algorithm by using the ACN, thus the communication quality for each UE can be improved.

A method is proposed in this invention for supporting downlink JD (joint detection), to be performed by a TDD CDMA communication network system, comprising: (a) judging whether the CAI (codes allocation information) for a downlink timeslot will change in the next TTI (transmission time interval); (b) inserting the changed CAI as a specific control information into a specified field in the traffic burst in the downlink timeslot corresponding to current TTI if the CAI will change; (c) sending the traffic burst containing the specific control information to each UE in the downlink timeslot via a downlink channel. Wherein the initial CAI is sent to the UE by the network system when the network system establishes connection with the UE.

A method is proposed in this invention for supporting downlink JD, to be performed by a UE in a TDD CDMA communication system, comprising steps of: (i) in the downlink timeslot, receiving a traffic burst transferred by the network system via the downlink channel; (ii) detecting whether the traffic burst contains the CAI in the next TTI for the downlink timeslot; (iii) extracting the CAI if the traffic burst contains the CAI; (iv) performing next-phase JD algorithm to decrease interference by using the CAI.

A method is proposed for supporting downlink single-user JD in a TDD CDMA communication system, to be performed by a network system, comprising steps of: (a) judging whether the ACN for a downlink timeslot will change in the next TTI; (b) inserting the changed ACN as a specific control information into a specified field in the traffic burst in downlink timeslot corresponding to current TTI if the ACN will change; (c) sending the traffic burst containing the specific control information to each UE in the downlink timeslot via downlink channel. Wherein the network system sends the initial ACN to the UE when the network system establishes connection with the UE.

A method is proposed for supporting downlink single-user JD in a TDD CDMA communication system, to be performed by a UE, comprising steps of: (i) receiving a traffic burst transferred by the network system via downlink channel in a downlink timeslot; (ii) detecting whether the traffic burst contains the ACN for the downlink timeslot in the next TTI; (iii) extracting the ACN if the traffic burst contains the ACN; (iv) performing the next-phase single-user JD algorithm by using the CAN, to decrease interference.

BRIEF DESCRIPTION OF THE DRAWINGS

For a detailed description of the preferred embodiments of the invention, reference will now be made to the accompanying drawings in which:

FIG. 6 illustrates the downlink timeslot formats after the CAI is inserted in TD-SCDMA system in accordance with the present invention;

DETAILED DESCRIPTION OF THE INVENTION

In the following, TD-SCDMA system will be exemplified to describe the present invention in conjunction with accompanying figures. Referring to the technical scheme of the present invention, when the above CAI/ACN information changes, the base station inserts the changed CAI/ACN information into the traffic burst to be transmitted, and sends the traffic burst in downlink timeslot to each UE in the downlink timeslot via DPCH (dedicated physical channel). Each UE executes next-phase ZF-BLE/MMSE-BLE or MMSE-BLE-SD JD algorithms according to the detected CAI.

Figure 1:
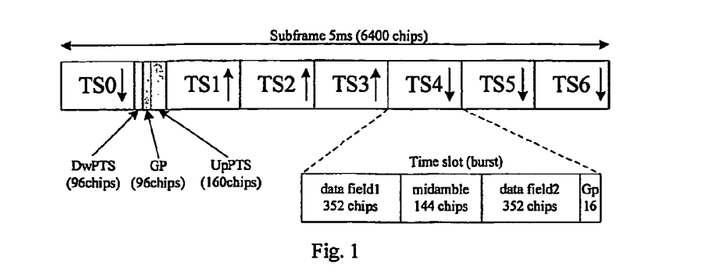
FIG. 1 illustrates the sub-frame and timeslot structures used in conventional TD-SCDMA systems.

The above scheme of the present invention, especially the detailed procedure as how the base station inserts the changed CAI/ACN information into the traffic burst to be transmitted, can be more fully understood with reference to FIG. 1 to FIG. 3, wherein a brief introduction will first be given to the sub-frame and traffic burst (i.e. timeslot) structures used in TD-SCDMA system in 3GPP standards.

In TD-SCDMA system, a radio frame is 10 ms in duration, and every radio frame is divided into two sub-frames, wherein each sub-frame is 5 ms in duration and composed of 6400 chips. As FIG. 1 shows, every sub-frame is composed of 7 traffic timeslots TS0-TS6 and 3 special pilot timeslots, wherein every traffic timeslot is composed of 864 chips, TS0 is always used for carrying downlink data, TS1 is always used for carrying uplink data, and TS2-TS6 can be used for respectively carrying data in uplink or downlink. As to the three special pilot timeslots, DwPTS is downlink pilot timeslot (96 chips), UpPTS is uplink pilot timeslot (160 chips) and GP is guard period (96 chips). Every traffic timeslot is divided into 4 fields, including data field 1 (352 chips), midamble field (144 chips), data field 2 (352 chips) and the empty field GP for timeslot guard (16 chips), wherein besides the traffic data symbols carried in two data fields 1 and 2, there can also be some UE specific control symbols, such as TPC (Transmitter Power Control), SS (Synchronization Shift) and TFCI (Transmitter Format Combination Indicator). The base station can provide some control information to each UE by using these UE specific control symbols.

Figure 2:
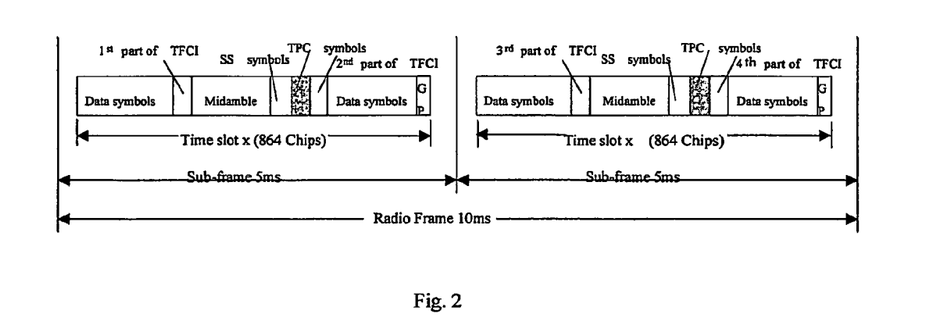
FIG. 2 illustrates the sub-frame and timeslot structures with UE specific control symbols in conventional TD-SCDMA systems.

FIG. 2 illustrates the sub-frame and timeslot structures loaded with UE specific control symbols. UE specific control symbols are located at two sides of midamble (or namely pilot symbol), and the control symbols for SS and TPC respectively occupy the places of some data symbols in data field 2 in one timeslot of each sub-frame. Whereas the control symbols for TFCI are divided into four parts, the first and second parts respectively occupy the places of some data symbols in data field 1 and data field 2 in one timeslot (the same as SS and TPC) of a sub-frame in a radio frame, and the third and fourth parts respectively occupy the places of some data symbols in data field 1 and data field 2 in the corresponding timeslot of another sub-frame in the radio frame. The control symbols for TPC, SS and TFCI are located in the data field in traffic timeslot, so they can be sent to each UE only after being coded and spread, just as other data symbols. After receiving the data containing the above control information from the base station, each UE has to recover the information contained in these control symbols through some basic baseband processing.

A brief description is given above to the frame and timeslot structures in TD-SCDMA system. In a timeslot, the structure of traffic burst or namely the allocation of traffic data and UE specific control symbols, depends on many aspects, such as the timeslot is used for uplink or downlink, the spreading factor and so on. For example, according to the standard of conventional TD-SCDMA protocols, the uplink spreading factor (SF) can be 1, 2, 4, 8 or 16, while the downlink SF can only be 1 or 16. According to the relationship between the number of the data symbols accommodated in the data field and the SF as promulgated in the protocols, S×SF=352 chips, an uplink timeslot can accommodate 704, 352, 176, 88 or 44 data symbols (two data fields are included in a timeslot). According to QPSK modulation which puts two bits in a symbol, an uplink timeslot can have 1408, 704, 352, 176 or 88 bits corresponding to different SFs. On the other hand, corresponding to the fact that the downlink SF can be 1 or 16, a downlink timeslot can contain 704 or 44 data symbols. According to QPSK modulation which puts two bits in a symbol, a downlink timeslot can have 1408 bits when SF=1, and 88 bits when SF=16.

Figure 3:
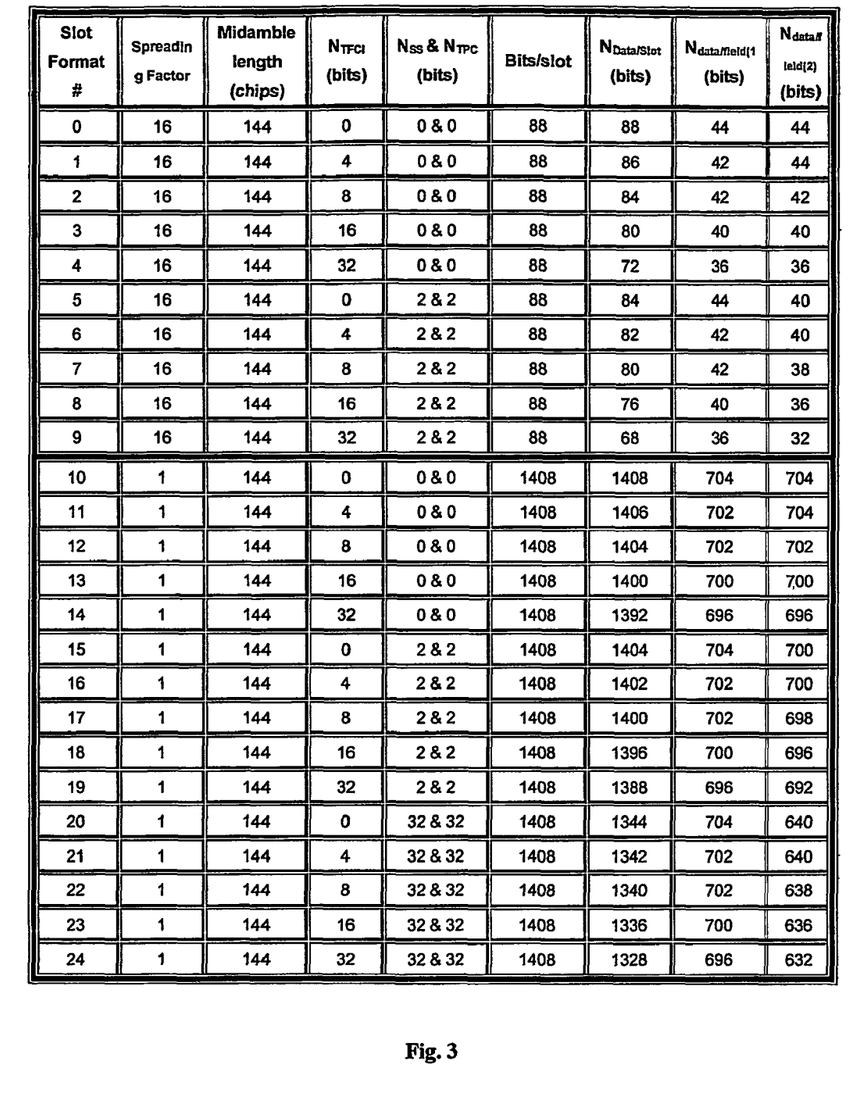
FIG. 3 illustrates the downlink timeslot formats in conventional TD-SCDMA systems.

FIG. 3 illustrates the downlink timeslot formats in conventional TD-SCDMA systems, wherein the number of bits NTFCI in the fourth column for coded control symbols TFCI can be 0, 4, 8, 16 or 32 bits respectively (these bits will be allocated evenly to a radio frame or namely two sub-frame) according to the amount of TFCI information. As to control symbols SS and TPC in the fifth column, when SF=16, if information about SS and TPF is not included in the timeslot, the number of bits for SS and that for TPC are both 0, and if information about SS and TPF is included in the timeslot, the number of bits for SS and that for TPC are both 2. Similarly, when SF=1, the number of bits NSS for SS and the number of bits NTPC for TPC can both be 1, 2 or 32.

As FIG. 3 illustrates the example of the timeslot format whose sequence is 8, when SF=16, the number of bits included in the downlink timeslot is 88 as noted above.

In the downlink timeslot, NTFCI in the fourth column is 16 bits. According to the protocol, these 16 bits can be divided into 4 parts, the 4 bits of the first or third part occupy 4 bits in data field 1 of the timeslot, while the 4 bits of the second or fourth part occupy 4 bits in data field 2 of the timeslot. NSS and NTPC in the fifth column are both 2 bits, occupying 2 bits in data field 2 of the timeslot respectively. NTFCI, NSS and NTPC all need to use data field for transfer, so there are 76 bits remained (88−8(NTFCI)−2(NSS)−2(NTPC)=76) of the 88 bits of the timeslot for data transfer service, wherein the 44-bit data field 1 has 40 bits remained (44−4(NTFCI of the first or third part)=40) for data transfer service, and the 44-bit data field 2 has 36 bits remained (44−4(NTFCI of the second or fourth part)−2(NSS)-2(NTPC)=36) for data transfer service. After the UE specific control symbols are inserted, the number of bits for data transfer in the timeslot, in data field 1 and 2 of the timeslot can respectively be represented by Ndata/Slot, Ndata/field(1) and Ndata/field(2) in the seventh, eighth and ninth column as shown in FIG. 3.

The proposed method for UEs to perform JD by using dedicated physical channel to transfer the changed CAI or ACN when the CAI or ACN changes, is similar to the above method of inserting UE specific control symbols TFCI, SS and TPC into the data field of the traffic timeslot. In the present invention, control symbols for the changed CAI or ACN are inserted into data field 1 or 2 of the traffic timeslot, and then sent to UEs via downlink channel after being coded and spread.

Figure 4:
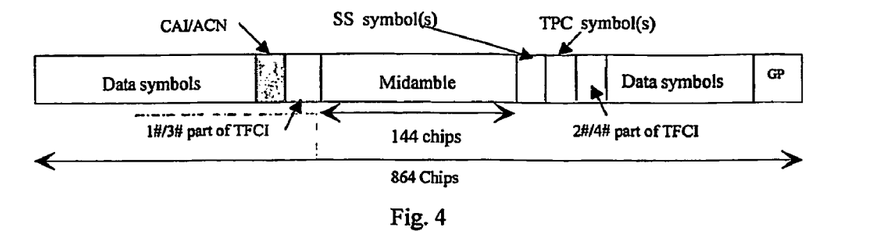
FIG. 4 illustrates structure of the revised traffic burst including CAI/ACN information in TD-SCDMA system in accordance with the present invention.

FIG. 4 illustrates structure of the revised traffic burst including CAI/ACN information in TD-SCDMA system in accordance with the present invention, wherein control symbols for CAI/ACN occupy some places of data symbols in data field 1, which is preceding TFCI of the first or third part (CAI/ACN can also be allocated behind TFCI in data field 2, or in other places in data field 1).

In the following, a description will be given to the detailed procedures of inserting CAI and ACN information respectively into data field of the traffic timeslot when adopting ZF-BLE/MMSE-BLE and MMSE-BLE-SD algorithms to implement JD, based on the timeslot structure as shown in FIG. 4, in conjunction with FIG. 5 to FIG. 8.

I. Implementing Downlink JD with ZF-BLE or MMSE-BLE

As described above, in the downlink of TD-SCDMA system, SF can only be 1 or 16. When SF is 1, only one user is allocated in the timeslot. There is no spreading at all in this case, so no problem exists for the allocation of spreading codes. Hence, this invention only takes the case where SF is 16 into consideration.

When SF=16, at most 16 spreading codes in a timeslot can be assigned to 16 code channels, so a timeslot can use 16 bits (two bytes) to represent allocation of 16 spreading codes. Referring to the mapping of CAI as displayed in FIG. 5, Bit15 to Bit0 respectively corresponds to the spreading codes Code15 to Code0 used by the 16 code channels, wherein if Bit i=1, the corresponding spreading code Codei is used by a user in the timeslot, and if Bit i=0, the corresponding spreading code Codei is not allocated to any UE yet. For example, when Bit0 and Bit5 are 1 while other bits are all 0 in FIG. 5, it means that only the corresponding spreading codes Code0 and Code5 are used by UEs while other spreading codes are not allocated yet.

Figure 5:
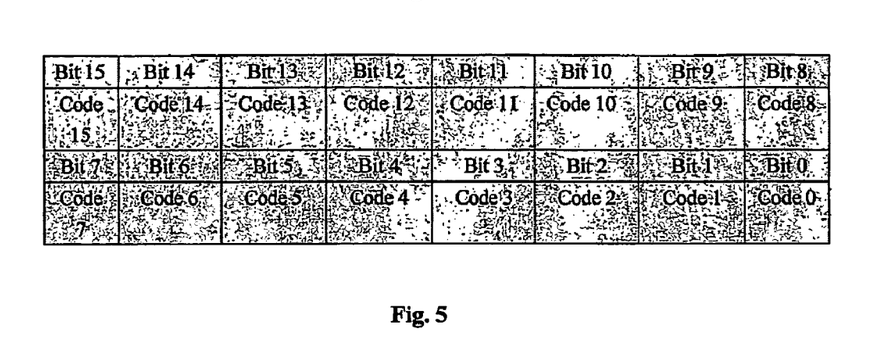
FIG. 5 illustrates the mapping relationship of the CAI in TD-SCDMA system in accordance with the present invention.

In downlink traffic timeslot, when the 16-bit CAI (the actual bit information may change after being channel coded, so we just assume that the transferred information is the 16-bit original bit information) shown in FIG. 5 is transferred using the data field, the traffic timeslot format as shown in FIG. 3 will change correspondingly, and the revised format is illustrated in FIG. 6. For convenience of comparison, the timeslot format sequences in the first column in FIG. 6 can respectively be denoted as n and n', wherein the row corresponding to n shows the timeslot format before CAI is inserted, and the row corresponding to n' shows the timeslot format after CAI is inserted, which are marked respectively in light and dark shadow. In any case, the timeslot formats denoted by n and n' will not occur concurrently.

Compared with FIG. 3, NCAI is added in the fourth column of FIG. 6, for representing CAI. When NCAI=0, it means that CAI has not changed and thus need not be transferred; when NCAI=16, it means that CAI changes, for example, when one or more active UEs leave the downlink timeslot and the base station needs to reclaim the spreading code resource released by the UEs, or when one or more UEs join the downlink timeslot and the base station needs to allocate spreading code resource for new UEs, or when the base station needs to reallocate the spreading code resource in the downlink timeslot to optimize resource configuration in the downlink timeslot, thus the 16-bit CAI needs to be transferred to indicate the current utilization of each spreading code in FIG. 5 corresponding to the CAI. After the CAI is inserted, the number of bits for data transfer, in data field 1 and 2 of the downlink timeslot can respectively be represented by Ndata/Slot, Ndata/field(1) and Ndata/field(2) in the eighth, ninth and tenth column as shown in FIG. 6.

When the base station judges that the CAI in a downlink timeslot will change in the next TTI, it will insert the changed 16-bit CAI as a specific control information into the data field (like the first data field as shown in FIG. 4) of the traffic burst corresponding to the downlink timeslot in current TTI, and spread the CAI along with other traffic data, UE specific control symbols TFCI, SS and TPC (if they exist). Then, the spread traffic burst containing the specific control information will be sent to each UE in the downlink timeslot, via downlink channel such as DPCH.

When a UE in the downlink timeslot receives the traffic burst from the base station via the DPCH, it first detects whether CAI is included in the traffic burst, just like detecting UE specific control symbols TFCI, SS and TPC. If CAI is included, it will be extracted and the UE can learn the allocation and utilization of the spreading codes in FIG. 5 corresponding to the CAI. Then, the UE makes preparation for implementing JD algorithms in the next TTI, by taking advantage of the detected CAI, that is to say, the extracted CAI is the CAI for the downlink in the next TTI. If CAI is not included in the traffic burst received by the UE, it indicates that the CAI has not changed, and the UE can execute next-phase JD algorithm according to prior CAI.

It should be noted herein: same as other traffic data, the CAI inserted into the data field need be spread before being transmitted, so user terminals have to use advanced receiving algorithms (such as JD) to detect the CAI effectively after receiving the information. But implementation of JD algorithms need know the information about the spreading codes in the timeslot in advance, hence the proposed method can't be used to despread and decode the data from the downlink by using the CAI in current timeslot. Therefore, the CAI detected in the above steps of the present invention, can only be used by the UE to executed JD algorithm in the next TTI (a TTI may include several sub-frames and is an interleaving period during which CAI won't change). When the UE establishes communication connection with the base station, the base station sends the initial CAI to the UE over BCH or other DCHs in an initializing fashion, so that the UE can execute JD algorithms by using the initialized CAI when receiving subsequent traffic burst transferred in the downlink timeslot, to detect whether new changed CAI has been sent to the UE.

Because the base station manipulates allocation of radio resources, at the beginning of establishing communication connection with the UE, the base station announces the initial CAI to the UEs allocated in the downlink timeslot, and in current TTI inserts the forecasted changed CAI in the next TTI into the downlink timeslot of current TTI to transfer it to each UE in the downlink timeslot. This shouldn't be a hard job for the base station in communication techniques.

As described above, the UE can detect that the network system dispatches the changed CAI via downlink when the CAI changed, thus can execute ZF-BLE/MMSE-BLE algorithm by using the received CAI.

II. Implementing Downlink JD with MMSE-BLE-SD

Different from implementing JD by using ZF-BLE/MMSE-BLE algorithm, when MMSE-BLE-SD is adopted, the UE only need know the ACN K in current timeslot without knowledge of the detailed CAI in the timeslot. Based on this, we can use 4 bits to represent the 16 possibilities of the ACN in the timeslot, as shown in FIG. 7.

Figure 7:
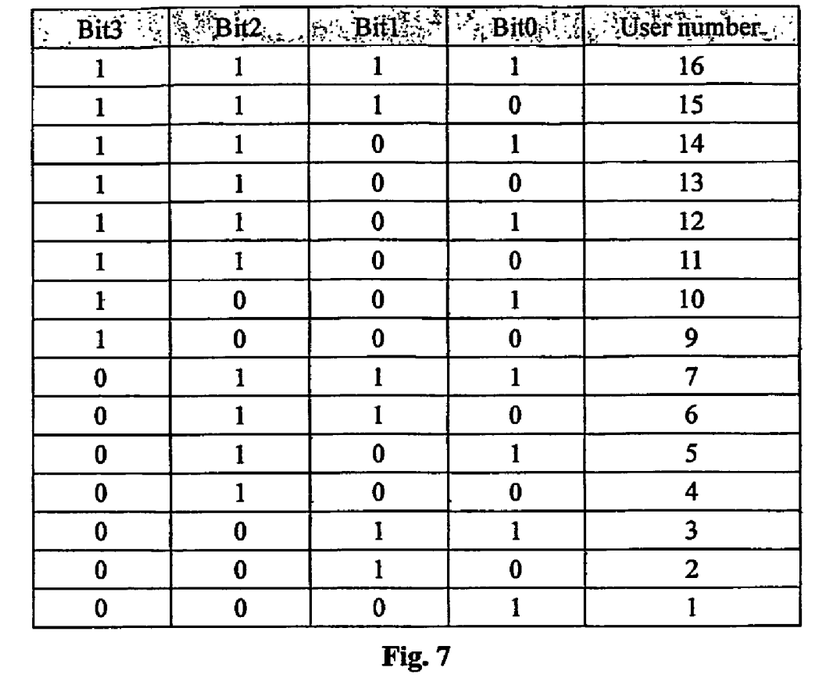
FIG. 7 illustrates the ACN represented by the ACN information in TD-SCDMA system in accordance with the present invention.
Figure 8:
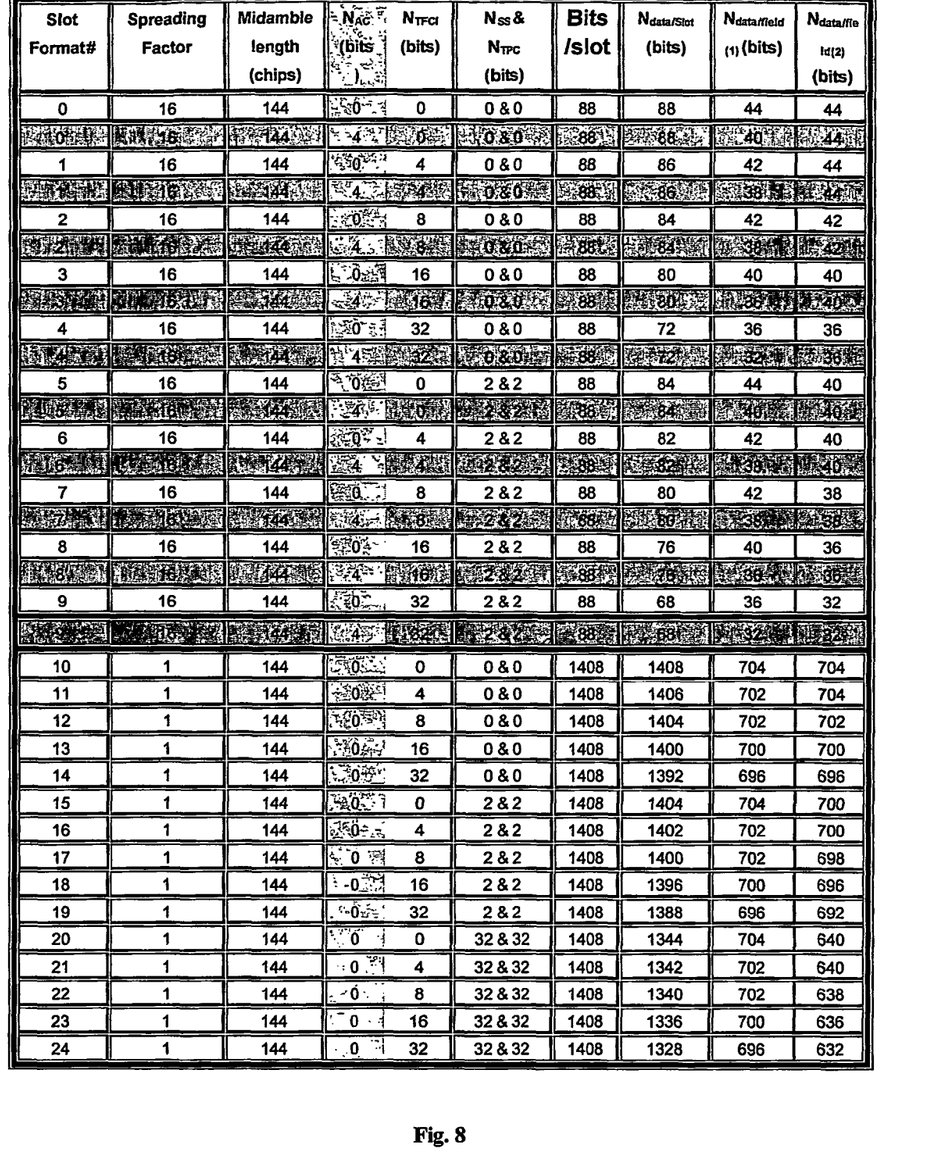
FIG. 8 illustrates the downlink timeslot formats after the ACN information is inserted in TD-SCDMA system in accordance with the present invention.

When the 4-bit ACN (the actual bit information may change after being channel coded, and we assume that the 4 bit original bit information is transferred) in FIG. 7 is sent in the downlink timeslot by using the data field, the traffic timeslot format shown in FIG. 3 has to be altered accordingly, and the revised format is illustrated in FIG. 8. For ease of comparison, the timeslot format sequences in the first column in FIG. 8 are also denoted as n and n' respectively, wherein the row corresponding to sequence n shows the timeslot format when ACN is not inserted, while the row corresponding to sequence n' shows the timeslot format after ACN is inserted, and they are marked respectively in light and dark shadows, moreover the timeslot format denoted by n and that by n' will not occur concurrently in any case.

Compared with FIG. 3, the fourth column NAC is added into FIG. 8, for denoting the ACN in current timeslot. When NAC =0, it means that the ACN in current timeslot has not changed and it's no necessity to send the ACN information; when NAC =4, it means that the ACN in current timeslot has changed and it's necessary to send the 4-bit ACN information. The number of bits for transferring traffic data in the downlink timeslot, in data field 1 and data field 2 in the downlink timeslot after the ACN information is inserted, can respectively be denoted as Ndata/Slot, Ndata/field(1) and Ndata/field(2) in the eighth, ninth and tenth column in FIG. 8.

When the base station judges that the ACN in a downlink timeslot will change in the next TTI, the 4-bit changed ACN information is inserted as a specific control information into the data field of the traffic burst in the downlink timeslot corresponding to the downlink timeslot in current TTI, such as the data field 1 as shown in FIG. 4. Then, the ACN information will be coded and spread along with other traffic data, and UE specific control symbols TFCI, SS and TPC (if UE specific control symbols exist). Afterwards, The coded, spread traffic burst containing the specific control information is sent to each UE in the downlink timeslot via the downlink channel, such as DPCH.

When receiving the traffic burst via the DPCH from the base station, a UE in the downlink timeslot first detects whether ACN information is contained in the traffic burst, just like the method of detecting UE specific control symbols TFCI, SS and TPC. If ACN information is contained, the ACN will be extracted, and the UE will make preparations for executing single-user JD algorithm in the next TTI, that is, the extracted ACN information is the ACN of the downlink timeslot in the next TTI. If ACN information is not contained in the traffic burst received by the UE, it shows that the ACN has not changed, and the UE can execute single-user JD algorithm of the subsequent phase, according to prior ACN.

Just like adopting ZF-BLE/MMSE-BLE algorithm as above, the ACN information detected in the steps of detecting ACN information, can only be provided to the UE for use in executing single-user JD algorithm in the next TTI. The initial ACN information can be provided to the UE by the base station in an initializing manner early when the UE establishes communication connection with the base station.

As described above, because the UE detects that the network system sends the changed ACN information via downlink when the ACN information changes, the UE can execute MMSE-BLE-SD algorithm by using the received ACN information.

In accordance with the foregoing method, during communication procedure, when the CAI or ACN information changes, the base station can insert the changed CAI or ACN information into corresponding traffic burst in form of specific control information, so that the UE receiving the traffic burst can execute JD algorithm according to the CAI or ACN information, and thus decrease interference during communication procedure. For UEs not in communication procedure, for example, when a UE is establishing communication connection or the communication connection is being handed over to other cells, the initialized CAI or ACN information can be sent to the UEs as a portion of resource allocation message or handover command message, so that the UEs can execute JD algorithm according to the CAI or ACN information in the resource allocation message or handover command message, and thus reduce interference during call establishment and cell handover procedures.

The proposed method above is applicable to not only low chip-rate TD-SCDMA system, but also high chip-rate system with 3.84 chips/s and higher chip-rate system with 7.68 chips/s.

The method for inserting the CAI or ACN information into the traffic burst in form of specific control information and the method for detecting and utilizing the CAI or ACN information as proposed in the present invention, can be implemented as computer software, or hardware modules with the software functions, or combination of both.

Figure 9:
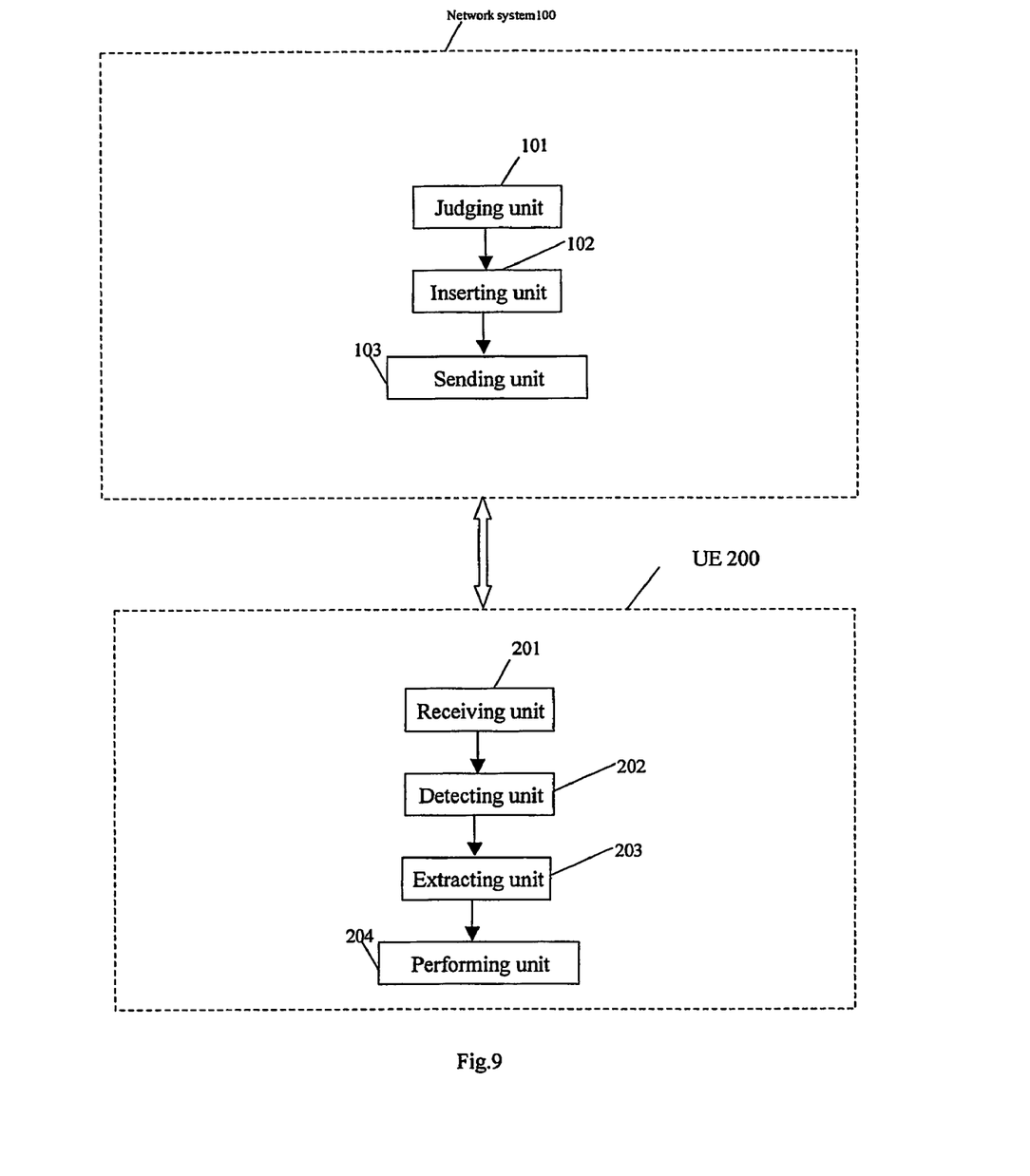
FIG. 9 is a block diagram illustrating the hardware modules implementing the method for supporting downlink JD in TDD CDMA communication system in accordance with the present invention.

When the proposed downlink JD method is implemented as hardware modules, the network system and the UE can be illustrated in FIG. 9, wherein the components same as those in current network systems and UEs are not given herein.

When an active UE leaves a downlink timeslot, or a new UE joins a downlink timeslot, or the network system reallocates the spreading code resource in a downlink timeslot, judging unit 101 in network system 100 judges whether the CAI will change in the next TTI. Inserting unit 102 inserts the changed CAI as specific control information into a specified field in the traffic burst in the downlink timeslot corresponding to the downlink timeslot in current TTI. Then, transmitting unit 103 sends the traffic burst containing the specific control information to each UE in the downlink timeslot via a downlink channel. Wherein the initial CAI is sent to each UE through transmitting unit 103 when the network system is establishing connection with the UE.

Receiving unit 201 in UE 200 receives the traffic burst sent by the network system via the downlink channel in a downlink timeslot. Detecting unit 202 detects whether the traffic burst contains CAI of the downlink timeslot in the next TTI. If CAI is contained, extracting unit 203 will extract it from the traffic burst, and provides it to executing unit 204 for executing next-phase ZF-BLE/MMSE-BLE JD algorithm. Wherein the initial CAI is received from the network system when receiving unit 201 is establishing connection with the network system.

When an active UE leaves a downlink timeslot, or a new UE joins a downlink timeslot, judging unit 101 in network system 100 judges that the ACN in the downlink timeslot will change in the next TTI. Inserting unit 102 inserting the ACN as a specific control message into a specified field of the traffic burst in the downlink timeslot corresponding to the downlink timeslot in current TTI. Then, transmitting unit 103 sends the traffic burst containing the specific control information to each UE in the downlink timeslot via downlink channel. Herein, the initial ACN is sent to the UE by transmitting unit 103 when the network system is establishing connection with the UE.

Receiving unit 201 in UE 200 receives the traffic burst in a downlink timeslot sent by the network system via the downlink channel. Detecting unit 202 detects whether the traffic burst contains the ACN of the downlink timeslot in the next TTI. If the ACN is contained, extracting unit 203 extracts the ACN from the traffic burst, and provides it to executing unit 204 for executing next-phase MMSE-BLE-SD JD algorithm. Herein, receiving unit 201 receives the initial ACN from the network system when establishing connection with the network system.

Beneficial Results of the Invention

Regarding to the above description of the embodiment of the present invention in connection with accompanying figures, in the proposed method and apparatus for supporting downlink JD in TDD CDMA communication systems, only when the CAI/ACN information in a timeslot changes, the base station will insert the changed CAI/ACN information in form of specific control information into the traffic burst and send the traffic burst to each UE in the downlink timeslot via DPCH, which avoids the overload phenomenon on BCH likely caused by sending CAI/ACN information every BCH repetition period, and avoids the unnecessary computation and power consumption brought by the fact that UEs in other timeslots also read the CAI/ACN information when the CAI/ACN information is sent via common control channels.

Meanwhile, with regard to the proposed method and apparatus for supporting downlink JD in TDD CDMA communication systems, a UE can execute ZF-BLE/MMSE-BLE or MMSE-BLE-SD algorithm according to the CAI/ACN information contained in the received traffic burst, thus to mitigate interferences during communication procedure and improve communication quality for the UE.

Furthermore, with regard to the proposed method and apparatus for supporting downlink JD in TDD CDMA communication systems, spreading codes are not transferred with the help of midamble information, so it is not subject to the constraint of the fixed relationship between midamble and spreading codes, and thus is applicable to various midamble allocation schemes in 3GPP standards.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for supporting downlink JD (joint detection) in a TDD CDMA communication network system, the method comprising:
   judging whether CAI (code allocation information) in a downlink timeslot will change in a next TTI (transmission time interval), wherein the judging comprises at least one of:
      judging that the CAI will change when at least one active UE leaves the downlink timeslot;
      judging that the CAI will change when at least one UE joins the downlink timeslot;
      judging that the CAI will change when spreading code resource in the downlink timeslot is reallocated to realize optimized configuration of the resource in the downlink timeslot; and
      judging that the CAI will change when the at least one active UE performs a cell handover;
   modifying the spreading code resource according to the changed CAI, the modifying of the spreading code resource comprising reclaiming the spreading code resource when the at least active UE leaves the downlink timeslot, allocating the spreading code resource when the at least one UE joins the downlink timeslot, and reallocating the spreading code resource when reallocated to realize optimized configuration of the resource or the at least one active UE performs a cell handover;
   inserting changed CAI as a specific control information into a specified field in a traffic burst in the downlink timeslot corresponding to current TTI only if the CAI will change, the changed CAI comprising spreading code resources associated with each of a plurality of UEs that uses the downlink timeslot, the changed CAI comprises the CAI after the spreading code resource is either allocated, reallocated, or reclaimed; and
   sending the traffic burst comprising the specific control information to each of the UEs in the downlink timeslot via a downlink channel, wherein the traffic burst sent to each of the plurality of UEs comprises spreading code resources associated with all of the UEs that use the downlink timeslot.

2. The method of claim 1, further comprising:
   when establishing connection with a UE, the network system sends the initial CAI to the UE.

3. The method in claim 1, wherein the specific control information allows each UE in the downlink timeslot to perform one of the two JD methods of ZF-BLE and MMSE-BLE.

4. A method for supporting downlink JD to be performed by a UE in a TDD CDMA communication network system, the method comprising:
   receiving a traffic burst in a downlink timeslot transferred by the network system via downlink channel;
   detecting whether the traffic burst comprises code allocation information (CAI) will change in a next TTI in the downlink timeslot, wherein the detecting comprises at least one of:
      detecting that the CAI will change when at least one active UE leaves the downlink timeslot;
      detecting that the CAI will change when at least one UE joins the downlink timeslot;
      detecting that the CAI will change when spreading code resource in the downlink timeslot is reallocated to realize optimized configuration of the resource in the downlink timeslot; and
      detecting that the CAI will change when the at least one active UE performs a cell handover;
   modifying the spreading code resource according to the changed CAI, the modifying of the spreading code resource comprising reclaiming the spreading code resource when the at least one active UE leaves the downlink timeslot, allocating the spreading code resource when the at least one UE joins the downlink timeslot, and reallocating the spreading code resource when reallocated to realize optimized configuration of the resource or the at least one active UE performs a cell handover;
   extracting the CAI only if the traffic burst comprises the CAI, the CAI comprising spreading code resources associated with all of a plurality of other UEs that use the downlink timeslot, the extracted CAI comprises the CAI after the spreading code resource is either allocated, reallocated, or reclaimed; and
   performing next-phase JD algorithm to decrease interference by using the CAI.

5. The method of claim 4, further comprising:
   the UE receives the initial CAI from the network system when the UE establishes connection with the network system.

6. The method of claim 5, wherein the JD algorithm is one of ZF-BLE and MMSE-BLE.

7. A method for supporting downlink single-user JD in a TDD CDMA communication network system, the method comprising:
   judging whether an ACN (active code number) in a downlink timeslot will change in a next TTI, wherein the judging comprises at least one of:
      judging that the CAI will change when at least one active UE leaves the downlink timeslot;
      judging that the CAI will change when at least one UE joins the downlink timeslot;
      judging that the CAI will change when spreading code resource in the downlink timeslot is reallocated to realize optimized configuration of the resource in the downlink timeslot; and
      judging that the CAI will change when the at least one active UE performs a cell handover;
   modifying the spreading code resource according to the changed CAI, the modifying of the spreading code resource comprising reclaiming the spreading code resource when the at least one active UE leaves the downlink timeslot, allocating the spreading code resource when the at least one UE joins the downlink timeslot, and reallocating the spreading code resource when reallocated to realize optimized configuration of the resource or the at least one active UE performs a cell handover;
   inserting changed ACN as a specific control information into a specified field in a traffic burst in downlink timeslot corresponding to current TTI only if the ACN will change, the ACN comprising spreading code resources associated with a plurality of UEs that use the downlink timeslot, the changed CAI comprises the CAI after the spreading code resource is either allocated, reallocated, or reclaimed;
   sending the traffic burst comprising the specific control information to each of the UEs in the downlink timeslot via downlink channel, wherein the traffic burst sent to each of the plurality of UEs comprises spreading code resources associated with all of the UEs that uses the downlink timeslot.

8. The method of claim 7, further comprising:
   the network system sending an initial ACN to the UE when the network system establishes connection with the UE.

9. The method of claim 8, wherein the specific control information allows each UE in the downlink timeslot to perform an MMSE-BLE-SD-JD algorithm.

10. A method performed by a UE for supporting downlink single-user JD in a TDD CDMA communication network system, the method comprising:
receiving a traffic burst transferred by the network system via downlink channel in a downlink timeslot;
detecting whether the traffic burst comprises an active code number (ACN) in the next TTI in the downlink timeslot, the ACN comprising spreading code resources associated with all of a plurality of other UEs that use the downlink timeslot, wherein the detecting comprises at least one of:
 detecting that the CAI will change when at least one active UE leaves the downlink timeslot;
 detecting that the CAI will change when at least one UE joins the downlink timeslot;
 detecting that the CAI will change when spreading code resource in the downlink timeslot is reallocated to realize optimized configuration of the resource in the downlink timeslot; and
 detecting that the CAI will change when the at least one active UE performs a cell handover;
modifying the spreading code resource according to the changed CAI, the modifying of the spreading code resource comprising reclaiming the spreading code resource when the at least one active UE the downlink timeslot, allocating the spreading code resource when the at least one UE joins the downlink timeslot, and reallocating the spreading code resource when reallocated to realize optimized configuration of the resource or the at least one active UE performs a cell handover;
extracting the ACN only if the traffic burst comprises the ACN, the extracted CAI comprises the CAI after the spreading code resource is either allocated, reallocated, or reclaimed; and
performing the next-phase JD algorithm to decrease interference by using the ACN.

11. The method of claim 10, wherein prior to receiving a traffic burst transferred by the network system the UE receives the initial ACN from the network system when the UE establishes connection with the network system.

12. The method of claim 11, wherein the JD method is an MMSE-BLE-SD method.

13. A network system for supporting downlink JD, comprising:
a judging unit configured to judge whether code allocation information (CAI) in a downlink timeslot will change in a next TTI, wherein the judging comprises at least one of:
 judging that the CAI will change when at least one active UE leaves the downlink timeslot;
 judging that the CAI will change when at least one UE joins the downlink timeslot;
 judging that the CAI will change when spreading code resource in the downlink timeslot is reallocated to realize optimized configuration of the resource in the downlink timeslot; and
 judging that the CAI will change when the at least one active UE performs a cell handover;
a resource unit configured to modify the spreading code resource according to the changed CAI, the modifying of the spreading code resource comprising reclaiming the spreading code resource the at least one active UE leaves the downlink timeslot, allocating the spreading code resource when the at least one UE joins the downlink timeslot, and reallocating the spreading code resource when reallocated to realize optimized configuration of the resource or at least one active UE performs a cell handover;
an inserting unit configured to insert changed CAI as a specific control information into a specified filed in a traffic burst in the downlink timeslot corresponding to current TTI only when the CAI changes, the changed CAI comprising spreading code resources associated with each of a plurality of UEs that uses the downlink timeslot, the changed CAI comprises the CAI after the spreading code resource is either allocated, reallocated, or reclaimed;
a sending unit configured to send the traffic burst comprising the specific control information to each of the UEs in the downlink timeslot via a downlink channel, wherein the traffic burst sent to each of the plurality of UEs comprises spreading code resources associated with all of the UEs that uses the downlink timeslot.

14. The network system of claim 13, wherein the sending unit sends the initial CAI to the UE when establishing connection with the UE.

15. A UE for supporting downlink JD, comprising:
a receiving unit configured to receive a traffic burst transferred by a network system via a downlink channel in a downlink timeslot;
a detecting unit configured to detect whether the traffic burst comprises code allocation information (CAI) in a next TTI in the downlink timeslot, the CAI comprising spreading code resources associated with all of a plurality of other UEs that use the downlink timeslot, wherein the detecting comprises at least one of:
 detecting that the CAI will change when at least one active UE leaves the downlink timeslot;
 detecting that the CAI will change when at least one UE joins the downlink timeslot;
 detecting that the CAI will change when spreading code resource in the downlink timeslot is reallocated to realize optimized configuration of the resource in the downlink timeslot; and
 detecting that the CAI will change when the at least one active UE performs a cell handover;
a resource unit configured to modify the spreading code resource according to the changed CAI, the modifying of the spreading code resource comprising reclaiming the spreading code resource when the at least one active UE leaves the downlink timeslot, allocating the spreading code resource when the at least one UE joins the downlink timeslot, and reallocating the spreading code resource when reallocated to realize optimized configuration of the resource or the at least one active UE performs a cell handover;
an extracting unit configured to extract the CAI only when the traffic burst comprises the CAI, the extracted CAI comprising the CAI after the spreading code resource is either allocated, reallocated, or reclaimed;
a performing unit configured to perform next-phase JD algorithm to decrease interference by using the CAI.

16. The user equipment of claim 15, wherein the receiving unit receives the initial CAI from the network system when establishing connection with the network.

17. A network system for supporting downlink single-user JD, comprising:
- a judging unit configured to judge whether an active code number (ACN) in a downlink timeslot will change in a next TTI, wherein the judging comprises at least one of:
  - judging that the CAI will change when at least one active UE leaves the downlink timeslot;
  - judging that the CAI will change when at least one UE joins the downlink timeslot;
  - judging that the CAI will change when spreading code resource in the downlink timeslot is reallocated to realize optimized configuration of the resource in the downlink timeslot; and
  - judging that the CAI will change when the at least one active UE performs a cell handover;
- a resource unit configured to modify the spreading code resource according to the changed CAI, the modifying of the spreading code resource comprising reclaiming the spreading code resource when the at least one active UE leaves the downlink timeslot, allocating the spreading code resource when the at least one UE joins the downlink timeslot, and reallocating the spreading code resource when reallocated to realize optimized configuration of the resource or the at least one active UE performs a cell handover;
- a specified field in a traffic burst in the downlink timeslot corresponding to current TTI only when the ACN changes, the ACN comprising spreading code resources associated with a plurality of UEs that use the downlink timeslot, the changed CAI comprises the CAI after the spreading code resource is either allocated, reallocated, or reclaimed; and
- a sending unit configured to send the traffic burst comprising the specific control information to each of the UEs in the downlink timeslot via downlink channel, wherein the traffic burst sent to each of the plurality of UEs comprises spreading code resources associated with all of the UEs that uses the downlink timeslot.

18. The network system of claim 17, wherein the sending unit sends the initial ACN to the UE when establishing connection with the UE.

19. A UE for supporting downlink single-user JD, comprising:
- a receiving unit configured to receive a traffic burst transferred by a network system via a downlink channel in a downlink timeslot;
- a detecting unit configured to detect whether the traffic burst comprises an active code number (ACN) in the downlink timeslot in a next TTI, wherein the detecting comprises at least one of:
  - detecting that the CAI will change when at least one active UE leaves the downlink timeslot;
  - detecting that the CAI will change when at least one UE joins the downlink timeslot;
  - detecting that the CAI will change when spreading code resource in the downlink timeslot is reallocated to realize optimized configuration of the resource in the downlink timeslot; and
  - detecting that the CAI will change when the at least one active UE performs a cell handover;
- a resource unit configured to modify the spreading code resource according to the changed CAI, the modifying of the spreading code resource comprising reclaiming the spreading code resource when the at least one active UE leaves the downlink timeslot, allocating the spreading code resource when the at least one UE joins the downlink timeslot, and reallocating the spreading code resource when reallocated to realize optimized configuration of the resource or the at least one active UE performs a cell handover;
- an extracting unit configured to extract the ACN only when the traffic burst contains the ACN, the ACN comprising spreading code resources associated with all of a plurality of other UEs that use the downlink timeslot, the extracted CAI comprising the CAI after the spreading code resource is either allocated, reallocated, or reclaimed; and
- a performing unit configured to perform next-phase single-user JD algorithm to decrease interference by using the ACN.

20. The UE of claim 19, wherein the receiving unit receives the initial ACN from the network system.

* * * * *